(12) United States Patent
Nishino

(10) Patent No.: US 11,835,915 B2
(45) Date of Patent: Dec. 5, 2023

(54) IMAGE FORMING APPARATUS HAVING HEAT DISSIPATION

(71) Applicant: CANON KABUSHIKI KAISHA, Tokyo (JP)

(72) Inventor: Yoshiro Nishino, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/861,343

(22) Filed: Jul. 11, 2022

(65) Prior Publication Data
US 2023/0031078 A1  Feb. 2, 2023

(30) Foreign Application Priority Data
Jul. 29, 2021  (JP) .................. 2021-123916

(51) Int. Cl.
G03G 21/00 (2006.01)
G03G 21/16 (2006.01)
H04N 1/00 (2006.01)
G03G 21/20 (2006.01)

(52) U.S. Cl.
CPC ..... *G03G 21/1647* (2013.01); *G03G 21/1676* (2013.01); *G03G 21/206* (2013.01); *H04N 1/00981* (2013.01)

(58) Field of Classification Search
CPC .......... G03G 21/1647; G03G 21/1676; G03G 21/20; G03G 21/206; G03G 2221/1645; H04N 1/00981
See application file for complete search history.

(56) References Cited

U.S. PATENT DOCUMENTS

| | | | |
|---|---|---|---|
| 9,176,430 B2 * | 11/2015 | Yoshizawa | G03G 15/0893 |
| 10,877,400 B1 * | 12/2020 | Kuramoto | G03G 21/206 |
| 2011/0038644 A1 * | 2/2011 | Onishi | G03G 21/206 399/99 |
| 2014/0140719 A1 * | 5/2014 | Suzuki | G03G 21/206 399/92 |
| 2017/0168421 A1 * | 6/2017 | Koshizuka | G03G 15/0881 |
| 2017/0285571 A1 | 10/2017 | Takahashi et al. | |
| 2020/0103824 A1 * | 4/2020 | Oshikawa | G03G 21/206 |

FOREIGN PATENT DOCUMENTS

| | | |
|---|---|---|
| JP | H02-029672 A | 1/1990 |
| JP | H03-067349 A | 3/1991 |
| JP | 2002-357952 A | 12/2002 |
| JP | 2015-082056 A | 4/2015 |

* cited by examiner

*Primary Examiner* — Sophia S Chen
(74) *Attorney, Agent, or Firm* — VENABLE LLP

(57) ABSTRACT

An image forming apparatus includes an image bearing member, a developing device including a developer container and a developer carrying member, a mounting portion, a moving mechanism, a cover member, a wall member, a first seal member, a second seal member, and a fan. When the developing device is in a separated position, neither the first seal member or the second seal member contacts the wall member. When the developing device is in a developing position, both the first seal member and the second seal member contact the wall member. When the developing device is in the developing position, a space for permitting passing of an airflow by the fan is formed along a mounting direction by the cover member, the wall member, the first seal member, and the second seal member.

20 Claims, 8 Drawing Sheets

IMAGE FORMING APPARATUS HAVING HEAT DISSIPATION

FIELD OF THE INVENTION AND RELATED ART

The present invention relates to an image forming apparatus such as a printer, a facsimile, a multi-function machine having a plurality of functions of these machines, or the like.

In the image forming apparatus, a toner image is formed by developing an electrostatic latent image, formed on an image bearing member, by a developing device. In the developing device, there is a tendency that a developer accommodated inside the developing device is stirred and fed, and therefore, a temperature of the developer increases. On the other hand, there are many constitutions in which the developing device is made mountable in and dismountable from an image forming apparatus main assembly for a maintenance operation, and constitutions in which the developing device is made rotatable between a developing position where the developing device is capable of developing the electrostatic latent image on the image baring member and a separated position where the developing device is separated from the developing position have been known.

In order to compatibly realize suppression of temperature rise of the developer and a mounting and dismounting constitution of the developing device, a constitution in which a cooling duct in which an airflow flows is formed by a developer container and a developing tray provided in the image forming apparatus main assembly has been proposed (U.S. Patent Application Publication No.: US2017/0285571). In the case of the constitution disclosed in US2017/0285571, when the developing device is put in the separated position, a part of the developing device is caused to enter an airflow space inside the cooling duct.

Here, in order to enhance cooling efficiency by the cooling duct, it would be considered that a plurality of heat dissipating portions are provided at a portion constituting the cooling duct of the developer container so as to project toward the airflow space. By this, the cooling efficiency can be enhanced by increasing a surface area in which the heat dissipating portions contact the airflow. However, as in the constitution disclosed in US2017/0285571, in the case where the part of the developer container is caused to enter the airflow space of the developer container when the developing device is put in the separated position, in order that the plurality of heat dissipating portions do not interfere with the developing tray even when the developing device is put in the separated position, there is a need to increase a space between the plurality of the heat dissipating portions and the developing tray.

Thus, in the case where the space between the heat dissipating portions and the developing tray is increased, in the developing position, the space between the heat dissipating portions and the developing tray is further increased. In this case, a flow passage resistance of the space between the heat dissipating portions and the developing tray becomes conspicuously lower than a flow passage resistance between the heat dissipating portions themselves, so that a flow rate of the air flowing through between the heat dissipating portions themselves becomes smaller than a flow rate of the air flowing through the space. As a result, efficiency of heat dissipation from the heat dissipating portions lowers, so that even when the heat dissipating portions are provided, there is a liability that the cooling efficiency by the cooling duct cannot be sufficiently enhanced.

SUMMARY OF THE INVENTION

A principal object of the present invention is to provide an image forming apparatus capable of forming a space, for permitting passing of an airflow for cooling a developing device when the developing device is in a developing position, along a direction in which the developing device is mounted in a mounting portion of the image forming apparatus.

According to an aspect of the present invention, there is provided an image forming apparatus comprising: an image bearing member; a developing device which includes a developer container configured to accommodate a developer containing toner and a carrier and which includes a developer carrying member configured to carry the developer for developing an electrostatic image formed on the image bearing member; a mounting portion configured to mount the developing device in the image forming apparatus; a moving mechanism configured to move the developing device mounted in the mounting portion from a separated position where the developing device is separated from the image bearing member than from a developing position where the electrostatic image formed on the image is developed, to the developing position; a cover member provided in the mounting portion along a mounting direction in which the cover member is mounted in the mounting portion and configured to cover the developer container by being mounted on the developer container; a wall member provided along the mounting direction, wherein when the developing device is moved from the separated position to the developing position by the moving mechanism, the wall member is not moved together with the developing device; a first seal member; a second seal member provided downstream of the first seal member with respect to a movement direction in which the developing device is moved from the separated position to the developing position by the moving mechanism; and a fan configured to generate an airflow for cooling the developing device, wherein when the developing device is in the separated position, neither the first seal member nor the second seal member contacts the wall member, and when the developing device is in the developing position, both the first seal member and the second seal member contact the wall member, and wherein when the developing device is in the developing position, a space for permitting passing of the airflow by the fan is formed along the mounting direction by the cover member, the wall member, the first seal member, and the second seal member.

Further features of the present invention will become apparent from the following description of exemplary embodiments with reference to the attached drawings.

DESCRIPTION OF THE EMBODIMENTS

An embodiment will be described using FIGS. 1 to 8. First, a schematic structure of an image forming apparatus according to the embodiment will be described.

[Image Forming Apparatus]

Figure 1:
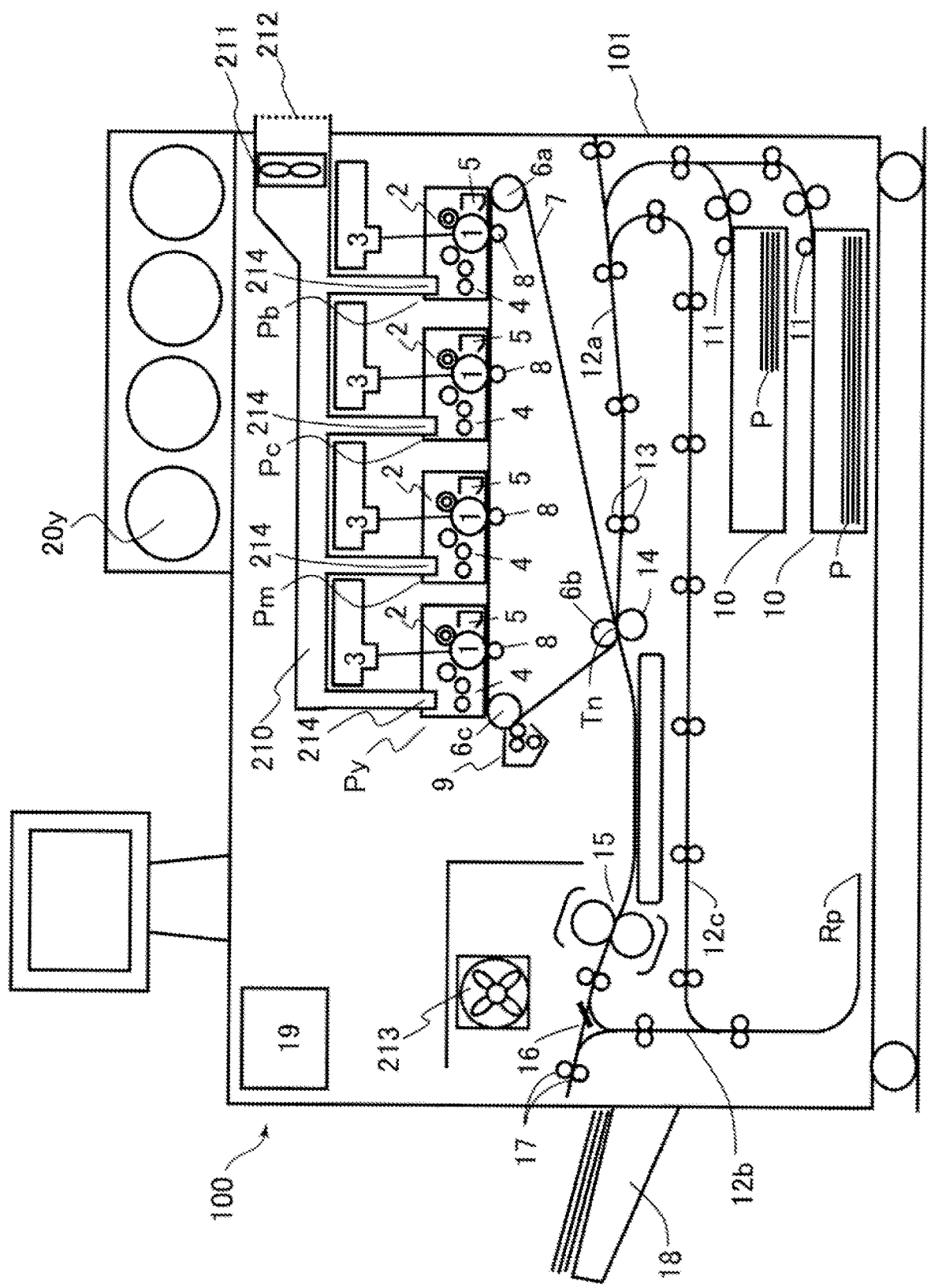
FIG. 1 is a schematic structural sectional view of an image forming apparatus according to an embodiment.

FIG. 1 is a schematic structural sectional view showing an example of the image forming apparatus according to this embodiment. An image forming apparatus 100 shown in FIG. 1 is a full-color laser printer of an electrophotographic type. The image forming apparatus 100 forms toner images of different four colors by first, second, third and fourth image forming portions Py, Pm, Pc and Pb juxtaposed inside an image forming apparatus main assembly 101, through processes of charging, exposure, development, and transfer.

A controller 19 includes a CPU and memories such as a ROM and RAM. The controller 19 successively operates the image forming portions Py, Pm, Pc and Pb in accordance with an image forming control sequence stored in the memory when a print instruction signal outputted from an external interface such as a host computer is inputted to the controller 19.

In each of the image forming portions Py, Pm, Pc and Pb, a photosensitive drum 1 as an image bearing member is rotated at a predetermined peripheral speed (process speed). Then, an intermediary transfer belt 7 extended and stretched around a driving roller 6a, a follower roller 6b, and a tension roller 6c so as to extend over the photosensitive drums 1 of the image forming portions Py, Pm, Pc and Pb is rotated at a peripheral speed corresponding to the rotational peripheral speed of the respective photosensitive drums 1 by the driving roller 6a. Then, in the image forming portion Py for yellow as a first color, an outer peripheral surface of the photosensitive drum 1 is electrically charged uniformly to a predetermined polarity and a predetermined potential by a charging device (charger) 2. Then, the charged surface of the photosensitive drum 1 is subjected to scanning exposure to laser light, generated on the basis of image information from an external device, by an exposure device 3. By this, on the charged surface of the photosensitive drum 1, an electrostatic latent image depending on the image information is formed.

The electrostatic latent image formed on the photosensitive drum 1 is developed with a yellow toner (developer) by a developing device 4, so that a yellow toner image (developer image) is formed on the surface of the photosensitive drum 1. When the toner (developer) in the developing device 4 is consumed, toner (developer) is supplied from a supplying device 20y. Similar steps of the charging, the exposure, and the development are also performed in the image forming portion Pm for magenta as a second color, the image forming portion Pc for cyan as a third color, and the image forming portion Pb for black as a four color.

The respective color toner images formed on the surfaces of the photosensitive drums 1 in the image forming portions Py, Pm, Pc and Pb are successively transferred superposedly onto an outer peripheral surface of the intermediary transfer belt 7 by primary transfer rollers (transfer members) 8 provided opposed to the associated photosensitive drums 1 through the intermediary transfer belt 7. By this, a full-color toner image is formed on the surface of the intermediary transfer belt 7. As regards the photosensitive drum 1 after the toner image transfer, transfer residual toner remaining on the surface of the photosensitive drum 1 is removed by a drum cleaner 5, and the photosensitive drum 1 is subjected to subsequent image formation.

On the other hand, a recording material P is fed from a feeding cassette 10 toward a registration roller pair 13 by a feeding roller 11 through a feeding (conveying) passage 12a. The recording material P is, for example, a sheet material such as a sheet, a plastic sheet, or the like. Then, the recording material P is conveyed to a secondary transfer nip Tn between the intermediary transfer belt 7 and a secondary transfer roller 14 by the registration roller pair 13. Then, in this secondary transfer nip Tn, the recording material P is nipped and conveyed, and in this conveying process, the toner image on the surface of the intermediary transfer belt 7 is transferred onto the recording material P by the secondary transfer roller 14. As regards the intermediary transfer belt 7 after the toner image transfer, transfer residual toner remaining on the surface of the intermediary transfer belt 7 is removed by a belt cleaner 9, and then the intermediary transfer belt 7 is subjected to a subsequent image formation.

The recording material P carrying the (unfixed) toner image is introduced into a nip of a fixing device 15 in a state in which an image carrying surface faces upward. Then, this recording material P is nipped and conveyed in the nip of the fixing device 15, whereby the toner image is heat-fixed on the recording material P. In the case where the image is formed only on one side of the recording material P, the recording material P discharged from the fixing device 15 is discharged onto a discharge tray 18 provided on a side surface of the image forming apparatus main assembly 101, by a switching member 16 through a discharging roller pair 17.

In the case where the images are formed on double sides of the recording material P, the recording material P discharged from the fixing device 15 is guided to a reverse conveying passage 12b below the switching member 16 by the switching member 16. In the reverse conveying passage 12b, the recording material P is switched back when a trailing end of the recording material P reaches a reverse point Rp and then is sent toward a double-side conveying passage 12c in a state in which the image carrying surface faces upward. In the double-side conveying passage 12c, the recording material P is conveyed to the registration roller pair 13 through the conveying passage 12a. This recording material P is conveyed to the secondary transfer nip Tn by the registration roller pair 13, and then is nipped and conveyed in this secondary transfer nip Tn. Then, in this conveying process, the toner image on the surface of the intermediary transfer belt is transferred onto the recording material P by the secondary transfer roller 14.

The recording material P carrying the (unfixed) toner image is introduced into a nip of a fixing device 15 in a state in which an image carrying surface faces upward. Then, this recording material P is nipped and conveyed in the nip of the fixing device 15, whereby the toner image is heat-fixed on the recording material P. The recording material P discharged from the fixing device 15 is caused to pass through the discharging roller pair 17 by the switching member 16, and then is discharged onto the discharge tray 18 by the discharging roller pair 17.

At an upper portion of the image forming apparatus main assembly 101, an air supplying port 212 is provided, and air is sent from an outside into an air supplying duct 210 by an air supply fan 211. The air supplying duct 210 is connected to a cooling duct 215 for guiding an airflow (air stream) into each of the image forming portions Py, Pm, Pc and Pb through a connecting port 214 provided in front of an associated one of the image forming portions Py, Pm, Pc and Pb, and introduces an airflow for cooling to an associated one of the developing devices 4 of the image forming portions Py, Pm, Pc and Pb. The airflow which cooled the image forming portions Py, Pm, Pc and Pb then cools electrical component portions provided behind the image forming apparatus main assembly 101, and then is discharged to the outside of the image forming apparatus 100 through an exhausting port (not shown) by an exhausting fan 213. Incidentally, a front side of the image forming apparatus 100 is a side where an operator operates the image forming apparatus 100, and in this embodiment, is a side where exchange of the developing device 4 or the like is made. A rear side is a rear surface side of the image forming apparatus 100.

[Duct Path]

Figure 2:
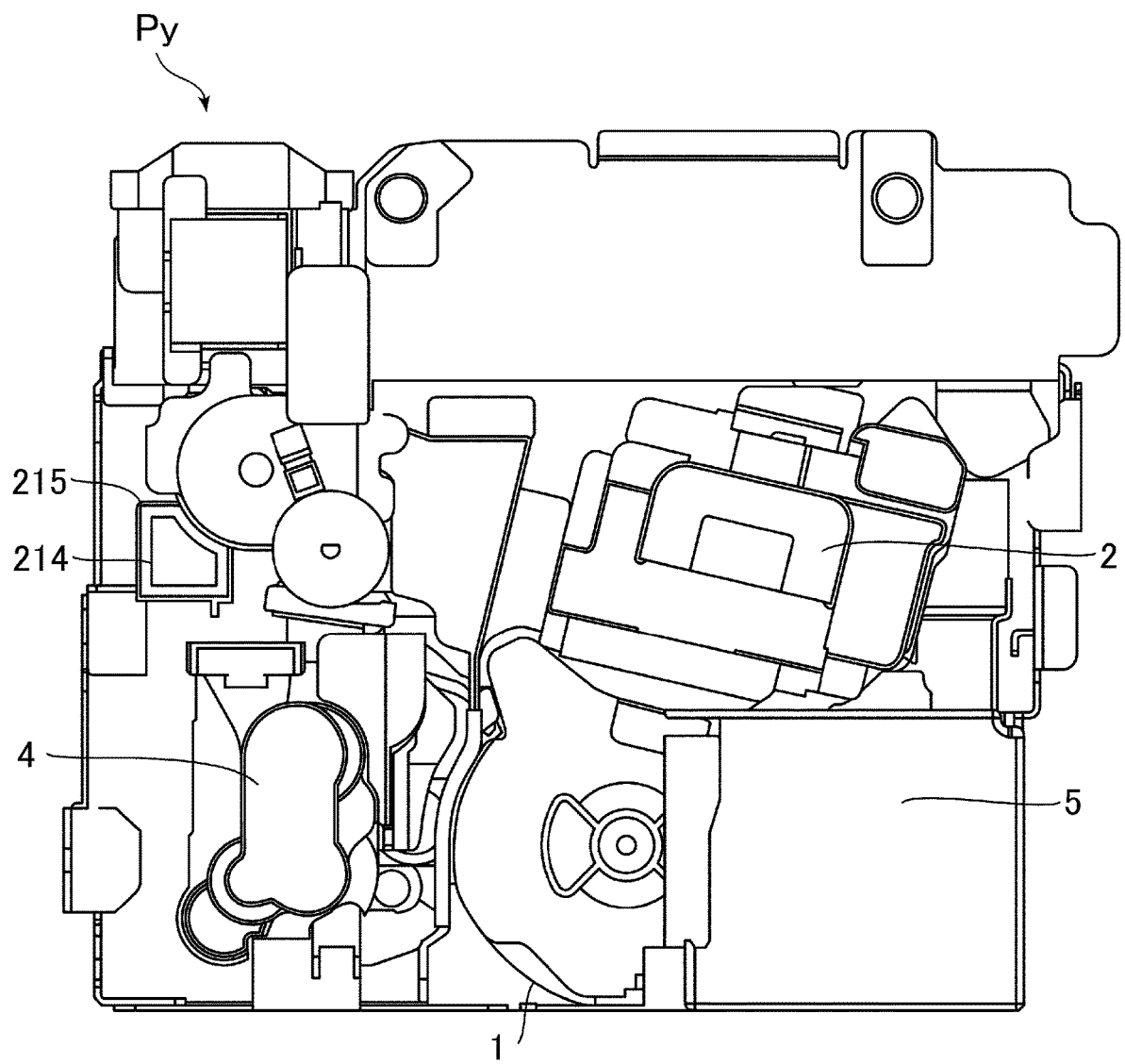
FIG. 2 is a front view of an image forming portion in the embodiment.

Next, a duct path passing through the image forming portions Py, Pm, Pc and Pb will be described. In this embodiment, although the image forming portions Py will be described, the image forming portions Py, Pm, Pc and Pb are only different in colors of the developers used, but are similar to each other in inside arrangement. FIG. 2 is a schematic view of the image forming portion Py on the front side. In front of the image forming portion Py, the connecting port 214 of the cooling duct 215 is disposed and connects the cooling duct 215 with the air supplying duct 210. The air supplying duct 210 and the cooling duct 215 are connected to each other, so that an airflow (air stream) 216 in the air supplying duct 210 is introduced into the cooling duct 215.

Figure 3:
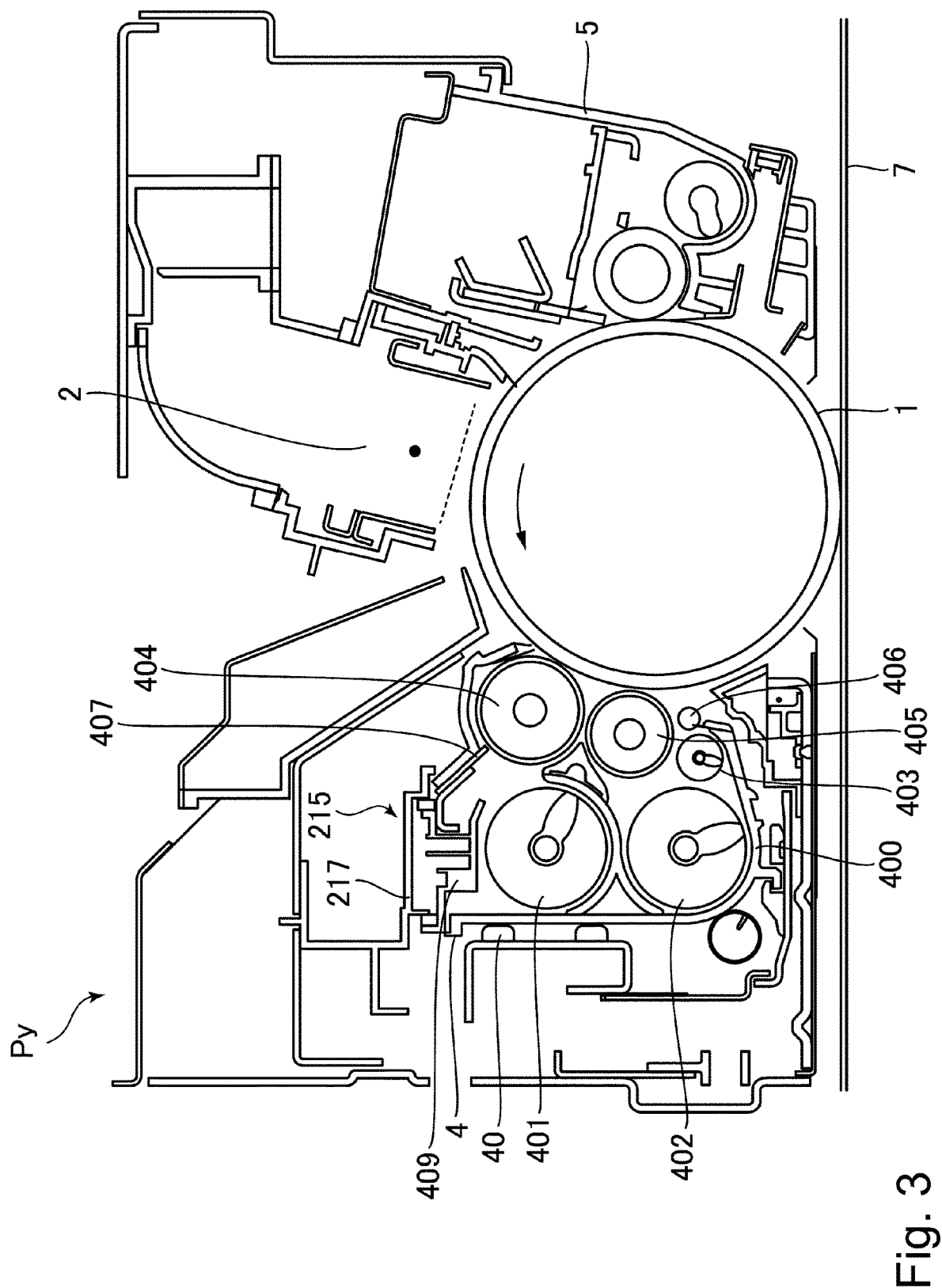
FIG. 3 is a sectional view of the image forming portion in the embodiment.

FIG. 3 is a schematic sectional view of the image forming portion Py. The photosensitive drum 1 is rotated counter-clockwise, and the charging device 2 is disposed at an upper portion and the developing device 4 is disposed on a left-hand side. On a side opposite from a side of the developing device 4 opposing the photosensitive drum 1, a pressing member 40 is provided and presses the developing device 4 toward the photosensitive drum 1, so that the developing device 4 is disposed so as to maintain a predetermined distance between itself and the photosensitive drum 1. Under the photosensitive drum 1, the intermediary transfer belt 7 is disposed, and on a right-hand side of the photosensitive drum 1, the drum cleaner 5 is disposed. At an upper portion of the developing device 4, the cooling duct 215 for cooling the developing device 4 is formed, and the airflow 216 supplied through the air supplying port 212 is caused to flow into the duct, so that the developer in the developing device 4 is cooled.

Figure 4:
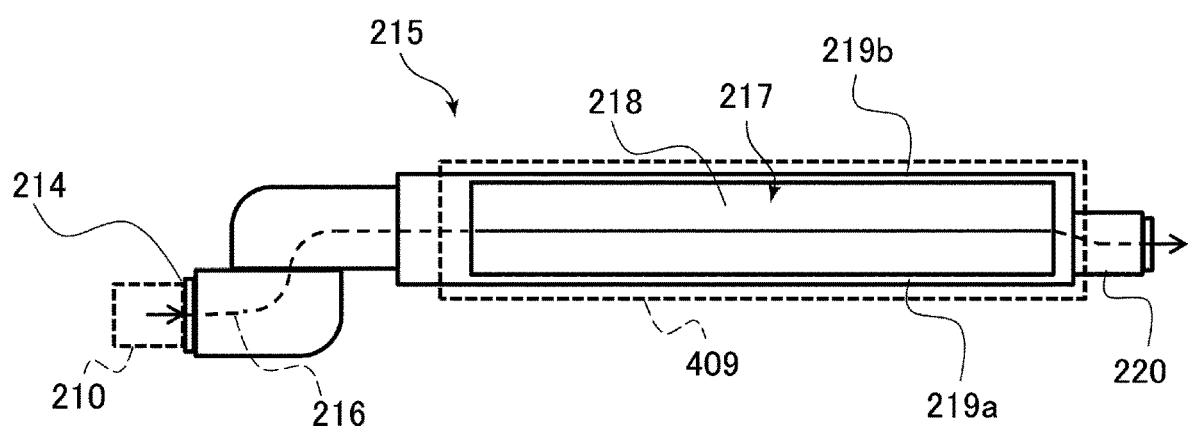
FIG. 4 is a schematic view of a cooling duct in the embodiment as viewed from below.

FIG. 4 is a schematic bottom view of the cooling duct 215. The cooling duct 215 is connected to the air supplying duct 210, provided in the image forming apparatus main assembly 101, through the connecting port 214, and guides the airflow to the upper portion of the developing device 4. The cooling duct 215 is divided into a duct wall 217 and a heat sink 409 at the upper portion of the developing device 4. In the cooling duct 215, the duct wall 217 on the image forming apparatus main assembly side forms an upper side, and when the developing device 4 is mounted in the image forming apparatus main assembly 101 and an image formable state is formed, the heat sink 409 disposed at the upper portion of the developing device 4 forms a lower side. On a side downstream of the upper portion of the developing device 4 with respect to a direction in which the airflow 216 flows, the cooling duct 215 is connected to a connecting duct 220 provided in the image forming apparatus main assembly 101. Then, the connecting duct 220 is connected to electric component portions provided inside the image forming apparatus main assembly 101 on the rear side. A detailed structure of the cooling duct 215 will be described later.

[Developing Device]

Figure 5:
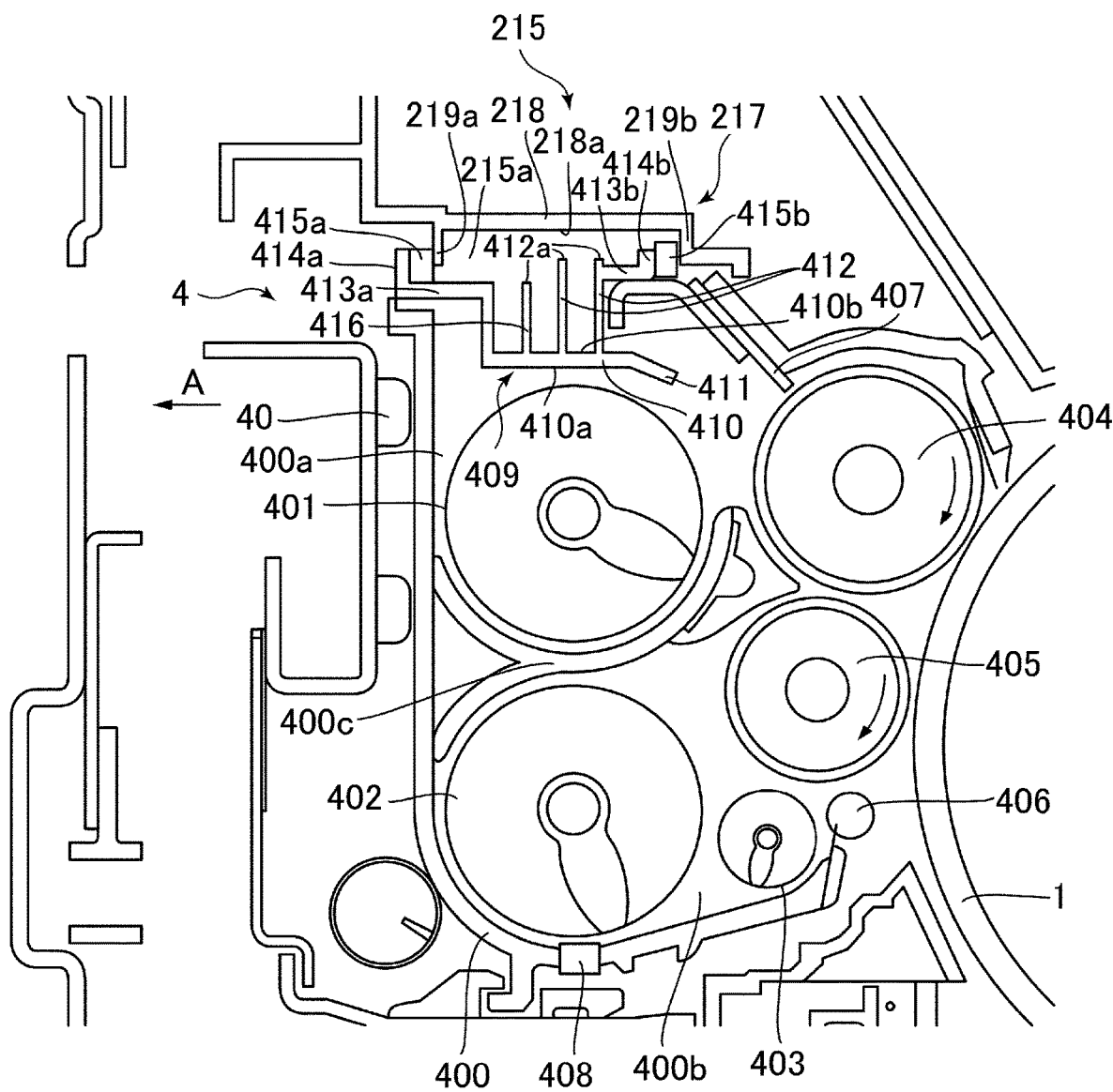
FIG. 5 is a sectional view of a developing device in the embodiment.

Next, the developing device 4 will be described. FIG. 5 is a schematic sectional view of the developing device 4 and a periphery thereof. The developing device 4 is mountable in and dismountable from the image forming apparatus main assembly 101 (FIG. 1). Specifically, the developing device 4 is capable of being inserted into and extracted from the image forming apparatus main assembly 101 with respect to a vertical direction of the drawing sheet of FIG. 1. Further, the developing device 4 is capable of being separated from the photosensitive drum 1 in an arrow A direction shown in FIG. 5. That is, the developing device 4 is slidably movable relative to the image forming apparatus main assembly 101 between a developing position where the electrostatic latent image formed on the photosensitive drum 1 is capable of being developed by a first developing roller 404 and a second developing roller 405 which are described later and a separated position which is separated from the photosensitive drum 1 than the developing position is and where the developing device 4 is mountable in and dismountable from the image forming apparatus main assembly 101.

Specifically, when the developing device 4 is extracted (dismounted) from the image forming apparatus main assembly 101, the developing device 4 is slid (moved) from the photosensitive drum 1 in the arrow A direction and is positioned in the separated position. A sliding direction of the developing device 4 is a direction perpendicular to a rotational axis direction of the photosensitive drum 1, and in this embodiment, is a direction along a transfer surface where the intermediary transfer belt 7 is extended between the driving roller 6a and the tension roller 6c and onto which the toner image is transferred from the photosensitive drum 1.

On the other hand, in the case where the developing device 4 is inserted into the image forming apparatus main assembly 101 and is mounted in a drive position, the developing device 4 is moved in a direction opposite to the arrow A direction and is positioned in the developing position (pressing position) where the first developing roller 404 and the second developing roller 405 oppose the photosensitive drum 1 with a predetermined interval (gap). At this time, the developing device 4 is pressed toward the photosensitive drum 1 by the pressing member 40 such as a spring, so that a part of the developing device 4 is contacted to a part of the photosensitive drum 1, and thus the above-described interval is maintained at an appropriate size.

In this embodiment in which a flange is provided at each of opposite end portions of the photosensitive drum 1 with respect to a longitudinal direction, for example, an abutment roller provided at each of opposite end portions of each of the first developing roller 404 and the second developing roller 405 with respect to the longitudinal direction is abutted against the associated flange provided at each of the opposite end portions of the photosensitive drum 1 with respect to the longitudinal direction. By this, the above-described interval is maintained at the appropriate size.

On the other hand, in this embodiment in which a flange is not provided at each of opposite end portions of the photosensitive drum 1 with respect to a longitudinal direction, for example, an abutment roller provided at each of opposite end portions of each of the first developing roller 404 and the second developing roller 405 with respect to the longitudinal direction is abutted against a bare tube (pipe) of the photosensitive drum 1. By this, the above-described interval is maintained at the appropriate size.

The developing device 4 develops the electrostatic latent image, formed on the photosensitive drum 1, with the developer containing the toner and a carrier. The developer in this embodiment is a so-called two-component developer comprising non-magnetic toner and a magnetic carrier. The developing device 4 includes a developer container 400 as a casing in which the developer is accommodated, and rotatably supports a first screw 401, a second screw 402 and a third screw 403 which are provided in the developer container 400. The first screw 401, the second screw 402, and the third screw 403 which are feeding members stir and convey the developer accommodated inside the developer container 400.

On a side where the developer container 400 opposes the photosensitive drum 1, the first developing roller 404 as a first developer carrying member and the second developing roller 405 as a second developer carrying member are rotatably supported. The second developing roller 405 is positioned below the first developing roller 404 and is disposed in parallel to the first developing roller 404 with a predetermined interval (gap) therebetween.

Each of the first developing roller 404 and the second developing roller 405 is formed in a cylindrical shape, and a magnet is non-rotatably provided therein. Each of the first developing roller 404 and the second developing roller 405 is rotationally driven in an arrow direction shown in FIG. 5, and carries and conveys the developer by a magnetic attraction force of the magnet. Further, at a position upstream of an opposing surface of the first developing roller 404 to the photosensitive drum 1, a developing blade 407 as a regulating member is fixed with a predetermined interval (gap) between itself and the first developing roller 404. The developing blade 407 regulates a layer thickness of the developer carried on the first developing roller 404.

The developer container 400 is partitioned into an upper-side developing chamber (developer feeding passage) 400a as a first chamber and a stirring chamber (developer feeding passage) 400b provided below the developing chamber 400a and as a second chamber by a partition wall 400c extending in the horizontal direction. The developing chamber 400a is a functional chamber for supplying the developer to the first developing roller 404. The stirring chamber 400b is a functional chamber for receiving and stirring a collected developer collected from the second developing roller 405, an excessive developer which is not supplied to the first developing roller 404 in the developing chamber 400a, and a supply developer supplied from the outside of the developing device 4.

The developing chamber 400a is provided therein with the first screw 401, and the developing chamber 400b is provided therein with the second screw 402 and the third screw 403. Each of the first screw 401, the second screw 402, and the third screw 403 is a screw member provided with a helical blade on a rotation shaft disposed substantially in parallel to rotational axis directions (longitudinal directions) of the first developing roller 404 and the second developing roller 405.

On opposite end portion sides of the partition wall 400c with respect to the longitudinal direction, a first communicating portion and a second communicating portion which are delivery portions (developer feeding (conveying) paths) for feeding (conveying) the developer between the developing chamber 400a and the stirring chamber 400b are provided. The first screw 401 and the second screw 402 convey the developer in opposite directions. Then, the developer is moved from the stirring chamber 400b to the developing chamber 400a through the first communicating portion, and is moved from the developing chamber 400a to the stirring chamber 400b through the second communicating portion, so that a developer circulating path is formed.

The developer conveyed by the second screw 402 and the first seal member 415a is conveyed along the surface of the first developing roller 404 and is restricted to a predetermined thickness by the developing blade 407. Then, in the developing position opposing the photosensitive drum 1, the electrostatic latent image formed on the photosensitive drum 1 surface is developed. The developer remaining on the first developing roller 404 is conveyed by the first developing roller 404, delivered to the second developing roller 405, conveyed along the second developing roller 405 surface, and then collected from between the second developing roller 405 and a collecting roller 406 into the developer container 400. The developer collected in the developer container 400 is stirred and conveyed by the third screw 403 and the second screw 402 and is conveyed to the first screw 401. Below the developer container 400, in a position facing the developer stirred and conveyed by the second screw 402, a temperature sensor 408 is provided and detects a temperature of the developer in the developer container 400.

[Cooling Duct]

In recent years, it has been required to compatibly realize speed-up of the process speed and downsizing of the image forming apparatus 100. In the case where the process speed of the image forming apparatus 100 is increased, the temperature of the developer in the developer container 400 is liable to increased due to an increase in driving speed of the respective portions, such as a conveying (feeding) speed of the developer in the developing device 4, or the like. Further, in the case where the image forming apparatus 100 is downsized, a space in which heat generated inside the image forming apparatus main assembly 101 is caused to escape becomes narrow, and further, a temperature rise of the developer is liable to occur. Therefore, in this embodiment, as described above, a cooling duct 215 in which an airflow (air stream) flows for cooling the developer is provided at an upper portion of the developing device 4.

The cooling duct 215 includes the duct wall 217, the heat sink 409, and a plurality of ribs 412 and 416 as shown in FIG. 5. The duct wall 217 as a main assembly-side wall portion is provided on the image forming apparatus main assembly side, and is not moved even when the developing device 4 is moved between the developing position (pressing position) and the separated position. The duct wall 217 is disposed along a mounting and dismounting direction of the developing device 4, i.e., a front-rear direction of the image forming apparatus 100 in this embodiment. The duct wall 217 may be formed of a material identical to or different from a material of the heat sink 409. Further, the duct wall 217 may preferably be formed of a material higher in thermal conductivity than a material of the developer container 400. In this embodiment, for example, the duct wall 217 is made of metal such as an aluminum alloy, but may also be made of a resin material high in thermal conductivity similarly as in the heat sink 409 described later. Further, the duct wall 217 includes a top surface portion 218 as an opposing wall portion, a connecting wall 219a as a projected wall portion or a main assembly-side first wall portion, and a connecting wall 219b as a main assembly-side second wall portion.

On the other hand, the heat sink 409 as a development-side wall portion is provided on a developer container side and forms an airflow space 215a in which the airflow flows between itself and the duct wall 217. The heat sink 409 is disposed along the mounting and dismounting direction of the developing device 4 similarly as the duct wall 217. Further, the heat sink 409 includes a contact wall portion 410, a side wall 414a as a development-side first wall portion, and a side wall 414b as a development-side second wall portion.

The plurality of ribs 412 and 416 as a plurality of heat dissipating portions are provided so as to project from the heat sink 409 toward an inside of the airflow space. The plurality of ribs 412 and 416 are disposed along a direction in which the airflow 216 flows inside of the cooling duct 215, and are specifically disposed along the mounting and dismounting direction of the developing device 4 similarly as the duct wall 217.

The connecting walls 219a and 219b of the duct wall 217 and the side walls 414a and 414b of the heat sink 409 are connected to each other, so that the cooling duct 215 in which the airflow 216 is capable of passing through between the duct wall 217 and the heat sink 409. Further, in the airflow space 215a in the cooling duct 215, the plurality of ribs 412 and 416 are disposed along a flowing direction of the airflow 216.

The cooling duct 215 will be specifically described. As described above, at the upper portion of the developing device 4, the heat sink 409 is made of the material higher in thermal conductivity than the material of the developer container 400. In this embodiment, the heat sink 409 also functions as an upper cap covering the upper portion of the developer container 400, and is disposed above the developing chamber 400a along a longitudinal direction. For example, the developer container 400 is made of a resin material of PC+ABS (polycarbonate-acrylonitrile-butadiene-styrene mixture), and the heat sink 409 is made of the aluminum alloy. Incidentally, the heat sink 409 may be made of another metal, other than the aluminum alloy, such as copper if another metal is higher in thermal conductivity than the developer container 400, and may also be made of a resin material to which a high-heat conduction function is imparted.

The heat sink 409 includes the contact wall portion 410 having a contact surface 410a contactable to the developer in the developer container 400. The plurality of ribs 412 and 416 are provided so as to project from a heat dissipating surface 410b opposite from the contact surface 410a of the contact wall portion 410. On the other hand, the top surface portion 218 of the duct wall 217 has an opposing surface 218a opposing free ends 412a of the plurality of ribs 412 and 416. In this embodiment, the opposing surface 218a and the heat dissipating surface 410b are substantially parallel to each other and are also substantially parallel to a direction in which the developing device 4 is slid and moved between the developing position and the separated position. Incidentally, "substantially parallel" refers to that a relative angle is within ±10°, preferably be within ±5°, and is the same in the case where it appears hereinafter.

Further, the duct wall 217 includes the connecting walls 219a and 219b as described above. The connecting wall 219a projects from a downstream side of the top surface portion 218 with respect to a predetermined direction toward a heat sink 409 side (development-side wall portion side). The connecting wall 219b projects from an upstream side of the top surface portion 218 with respect to the predetermined direction toward the heat sink 409 side. The connecting walls 219a and 219b are substantially parallel to each other, and are provided substantially perpendicular to the opposing surface 218a. Here, "substantially perpendicular" refers to that relative to one direction, another direction may preferably be 90°±10°, more preferably be 90°±5°, and is the same in the case where it appears hereinafter.

On the other hand, as described above, the heat sink 409 includes the side walls 414a and 414b as described above. The side wall 414a is disposed downstream of the connecting wall 219a with respect to the predetermined direction and closes the downstream side of the airflow space 215a with respect to the predetermined direction by being connected with the connecting wall 219a. The side wall 414b is disposed downstream of the connecting wall 219b with respect to the direction and closes the upstream side of the airflow space 215a with respect to the predetermined direction by being connected with the connecting wall 219b. Incidentally, in this embodiment, the connecting wall 219a and the side wall 414a are connected through a first seal member (sealing member) 415a, and the connecting wall 219b and the side wall 414b are connected through a second seal member (sealing member) 415b.

The first seal member 415a and the second seal member 415b are members such as elastic members having flexibility, and are provided in an elastically compressed state between the connecting wall 219a and the side wall 414a and between the connecting wall 219b and the side wall 414b, respectively. By this, the upstream side and the downstream side of the airflow space 215a are closed.

Incidentally, each of the first seal member 415a and the second seal member 415b may preferably be formed of a material higher in thermal conductivity than the material of the developer container 400. As such a seal member, for example, it is possible to cite a gasket for use in an electromagnetic wave shield. This gasket is provided so that a metal mesh winds about an outside of a sponge-like material, and therefore, has good thermal conductivity. Further, as the material itself of the seal member, a material with high thermal conductivity used for a purpose close to silicone grease may be used. By constituting the first seal member 415a and the second seal member 415b in such a manner, it becomes possible to transmit heat to the duct wall 217 from the heat sink 409 by heat conduction, and thus heat can be dissipated by the duct wall 217 in addition to the heat sink 409, so that it becomes possible to cool the developer more efficiently.

On a side downstream of the contact wall portion 410 of the heat sink 409, a bent portion 413a bent toward the duct wall 217 and then bent toward the downstream side with respect to the predetermined direction is provided. The first seal member 415a is provided on the bent portion 413a. On the other hand, of the plurality of ribs 412 and 416, the rib 412 positioned on a most upstream side with respect to the predetermined direction is provided with a projected portion 413b projected toward the upstream side of the predetermined direction, and the side wall 414b is formed at a free end of the projected portion 413b. Further, to the projected portion 413b, a supporting member 407a supporting the developing blade 407 is fixed, and the second seal member 415b is disposed on the supporting member 407a.

Further, at an upstream end of the contact wall portion 410 of the heat sink 409 with respect to the predetermined direction, a heat-dissipating projected portion 411 projected toward the upstream side of the predetermined direction is provided. The heat-dissipating projected portion 411 is projected from the contact wall portion 410 toward a space on a side upstream of the developing blade 407 with respect to a rotational direction of the first developing roller 404. This space is a space before the developer carried on the first developing roller 404 enters the developing blade 407 and constitutes a developer stagnation portion where the developer stagnates. Thus, the heat-dissipating projected portion 411 which is a part of the heat sink 409 is positioned in the developer stagnation portion disposed on a side upstream of the developing blade 407, so that heat of the developer before the developer enters the developing blade 407 can be caused to escape toward the heat sink 409 side. As a result, cooling of the developer before entering the developing blade 407 can be performed efficiently.

In the case of this embodiment, in addition to the above-described heat-dissipating projected portion 411, the contact surface 410a of the heat sink 409 facing the inside of the developer container 400 contacts the developer conveyed from the first screw 401 toward the developing roller 404 at a portion above the first screw 401, so that heat exchange is made. Further, with respect to the longitudinal direction of the developing device 4, about half of the developing chamber 400a has a height to the extent that a surface of the developer contacts the contact surface 410a, and therefore, as regards the developer at that portion, the heat exchange is made by contact of the developer with the contact surface 410a. Incidentally, in this embodiment, the heat sink 409 is disposed at the upper portion of the developer container 400, and therefore, a contact state of the heat sink 409 with the developer is as described above, but arrangement of the heat sink 409 is not limited thereto, and the heat sink 409 may be disposed so that entirety of the contact surface of the heat sink 409 contacts the developer.

In either case, the heat received from the developer as described above is conducted to the heat dissipating surface 410b of the heat sink 409 facing the outside of the developer container 400 is subjected to heat exchange with the airflow 216 which is introduced from the outside of the image forming apparatus main assembly 101 and which flows through the inside of the cooling duct 215 as described above. On the heat dissipating surface 410b, the plurality of ribs 412 and 416 are disposed, and the air is caused to flow through between the ribs 412 and 416, so that efficiency of the heat exchange is enhanced. Thus, in this embodiment, through the heat sink 409, by performing the heat exchange between the developer and the airflow flowing through the inside of the cooling duct 215, the developer in the developer container 400 is efficiently cooled.

[Control of Air Supply Fan]

Figure 6:
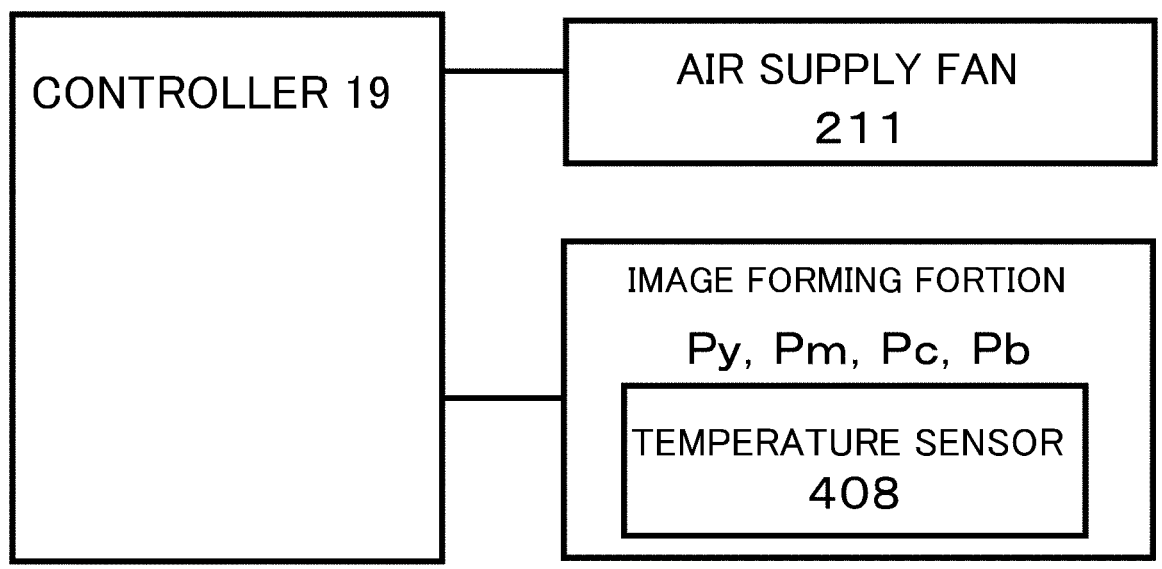
FIG. 6 is a block diagram showing a control constitution of an air supply fan in the embodiment.

Next, control of the air supply fan 211 sending the air into the cooling duct 215 will be described using FIGS. 6 and 7. As shown in FIG. 6, the air supply fan 211 is controlled by the controller 19 on the basis of a signal of the temperature sensor 408 provided in the developing device 4 of each of the image forming portions Py, Pm, Pc and Pb. In the case where the temperature of the developer is lower than a predetermined temperature, the air supply fan 211 rotates at a low speed. However, in the case where the temperature sensor 408 detects the temperature of the developer in the developing device 4 and the temperature of the developer exceeds the predetermined temperature, in order to enhance cooling power, the number of rotations of the air supply fan 211 is changed by an instruction from the controller 19, and the air supply fan 211 is rotated at a high speed, so that the temperature of the developer in the developing device 4 is prevented from becoming excessively high.

Figure 7:
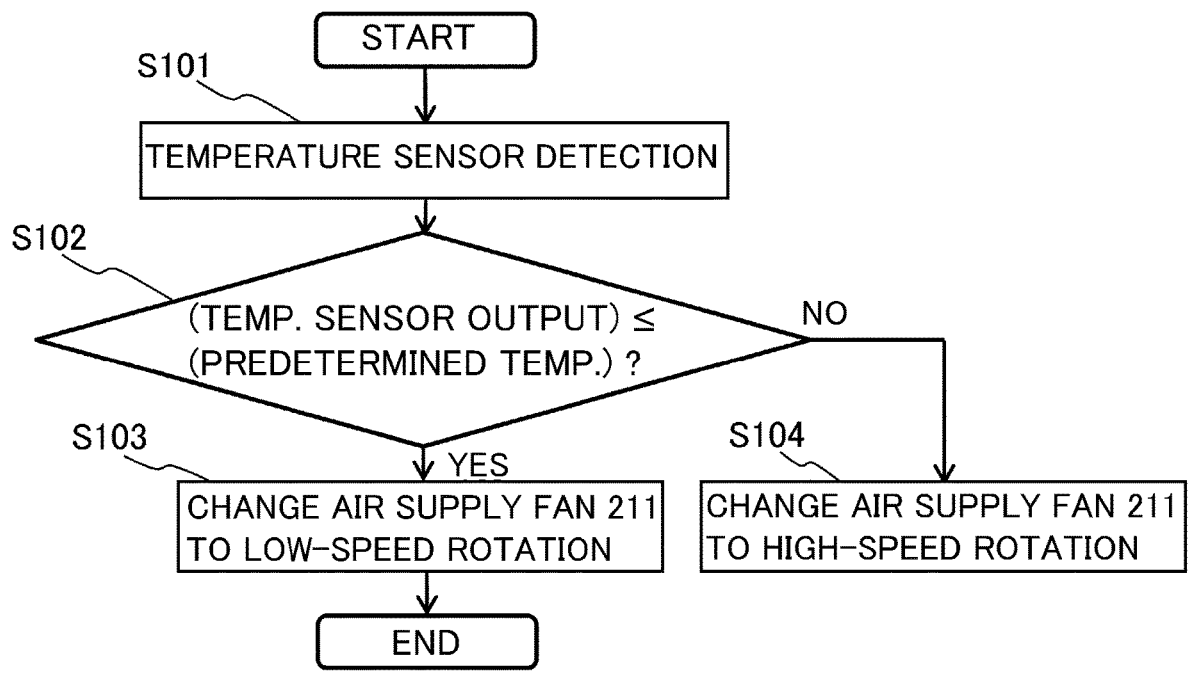
FIG. 7 is a flowchart of control of the air supply fan in the embodiment.

FIG. 7 shows a flow chart for driving the air supply fan 211 of the image forming apparatus 100. First, the controller 19 causes the temperature sensor 408 to detect the temperature of the developer in the developing device 4 (S101). Then, the controller 19 discriminates whether or not the temperature detected by the temperature sensor 408 satisfies a predetermined temperature, i.e., whether or not the temperature sensor output is the predetermined temperature or less (S102).

In S102, in the case where the temperature sensor output is the predetermined temperature or less, the number of rotations of the air supply fan 211 is not changed to a high speed (i.e., maintained at the low speed (S103)), the flow is ended. In S102, in the case where the temperature sensor output is higher than the predetermined temperature, the number of rotations of the air supply fan 211 is changed to the high speed (S104), and then the flow is ended.

[Mounting and Dismounting of Developing Device]

As described above, in this embodiment, the air is sent into the cooling duct 215 by the air supply fan 211, so that the developer in the developing device 4 is cooled. When the developing device 4 is mounted in and dismounted from the image forming apparatus main assembly 101, in order to prevent interference with the photosensitive drum 1, the developing device 4 is moved to the separated position as described above. As regards a movement direction of the developing device 4 to the separated position, conventionally, the developing device 4 has been rotationally moved. As in this embodiment, in the case of the constitution in which the cooling duct is divided into the developing device side and the image forming apparatus main assembly side, in order to prevent interference between the ribs and the duct wall opposing the ribs due to the rotational movement of the developing device, there was a need to enlarge a space between the ribs and the duct wall. In the case where such a constitution is employed, a flow passage resistance between the ribs becomes larger than that in this space, cooling efficiency was not readily enhanced.

Incidentally, it would be considered that a constitution in which the developing device is moved to a side opposite from the duct portion by the rotational movement is employed. That is, it would be considered that a positional relationship between the developing device and the duct wall is defined so that the space between the ribs and the duct wall is increased by the movement of the developing device to the separated position. However, in the case where such a constitution is employed, there is a need that a space for retracting the developing device is provided separated from the duct wall. For this reason, space efficiency lowers and upsizing of the image forming apparatus main assembly is invited.

Therefore, in this embodiment, the direction in which the developing device 4 is moved between the developing position and the separated position is not the rotational direction, but is a slide direction. Further, the direction in which the developing device 4 is slid and moved is a direction within ±10°, preferably within ±5°, relative to the opposing surface 218a of the developer container wall 217. That is, the developing device 4 is moved substantially parallel to the opposing surface 218a. By this, when the developing device 4 is moved to the separated position, it is possible to not only prevent the interference of the duct wall 217 on the image forming apparatus main assembly 101 side with the plurality of ribs 412 and 416 of the heat sink 409 moving together with the developing device 4 but also suppress a change in interval (gap) between the plurality of ribs 412 and 416 and the opposing surface 218a of the duct wall 217.

Further, the direction in which the developing device 4 is slid and moved is within 90°±10°, preferably be within 90°±5°, with respect to the direction in which the plurality of ribs 412 and 416 are projected. That is, the developing device 4 is moved in a direction substantially perpendicular to a projected direction of the plurality of ribs 412 and 416.

The plurality of ribs 412 and 416 are projected from the heat dissipating surface 410b so as to be parallel to each other and substantially perpendicular to the heat dissipating surface 410b of the contact wall portion 410. Further, the heat dissipating surface 410b and the opposing surface 218a are substantially parallel to each other. Accordingly, even when the interval between the free ends 412a of the plurality of ribs 412 and 416 and the opposing surface 218a is made narrow, it is possible to prevent the interference between the plurality of ribs 412 and 416 and the opposing surface 218a by movement of the developing device 4.

Further, a distance between the opposing surface 218a and the free end 412a of at least one rib 412 of the plurality of ribs 412 and 416 is made smaller (narrower) than a distance between the heat dissipating surface 410b and the free end 412a of the rib 412. All the ribs 412 and 416 may preferably satisfy such a distance (length) relationship.

By this, the flow passage resistance of the space formed between the ribs 412 and 416 is prevented from becoming excessively smaller or larger than the flow passage resistance of the space formed between the free ends 412a of the ribs 412 and 416 and the opposing surface 218a. For this reason, the airflow 216 passing through the inside of the cooling duct 215 uniformly passes through between the ribs 412 and 416, so that it becomes possible to enhance heat exchange efficiency between the heat sink 409 and the airflow 216.

Next, an operation when the developing device 4 is dismounted from the image forming apparatus main assembly 101 will be described.

In the case where the image formation is carried out, as shown in FIG. 5, the developing device 4 is positioned in the developing position (pressing position) where the developing device 4 is pressed toward the photosensitive drum 1 and is adjacent to the photosensitive drum 1 with a predetermined distance.

Figure 8:
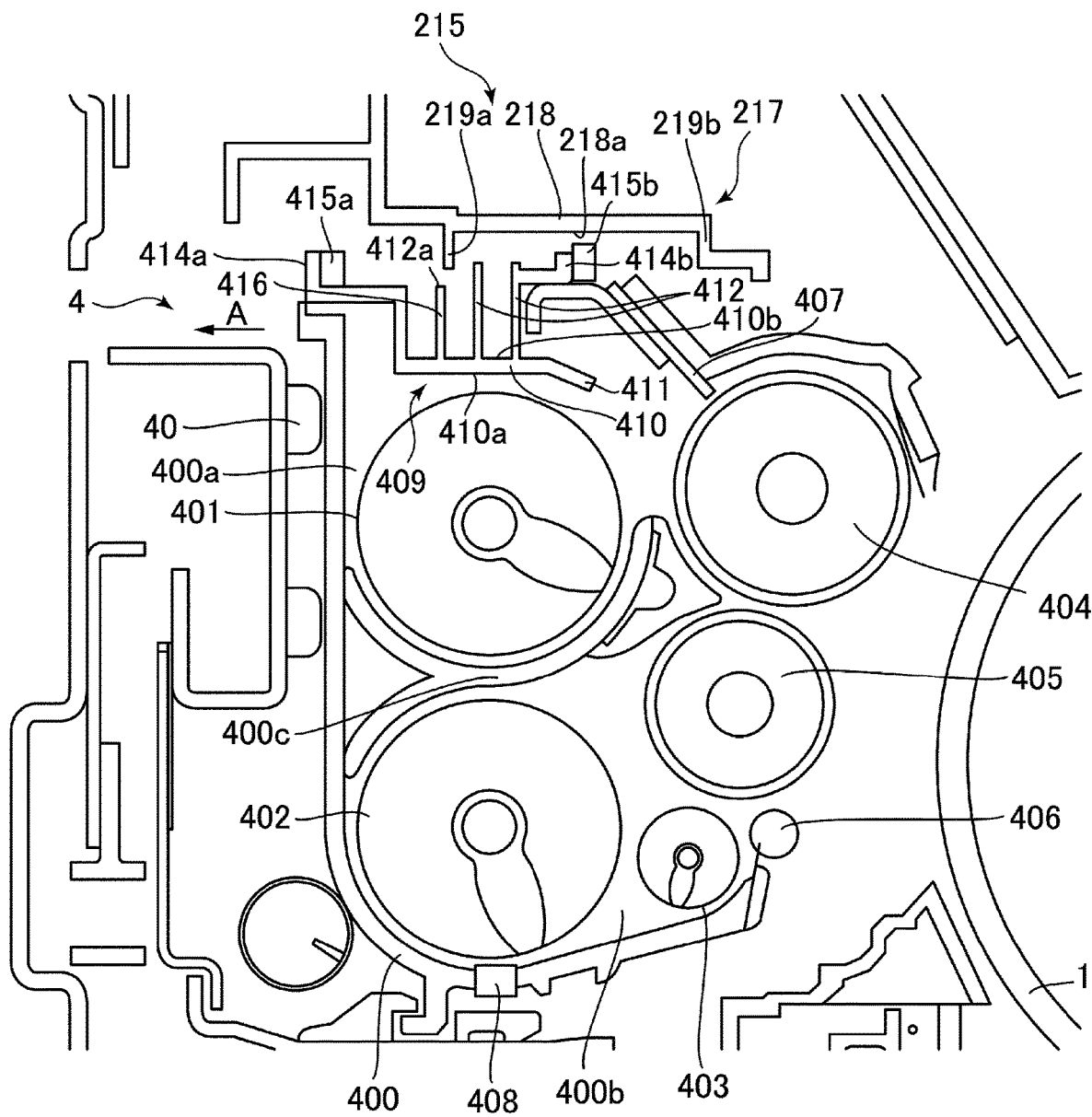
FIG. 8 is a sectional view of the developing device in a separated position in the embodiment.

On the other hand, when the developing device 4 is dismounted from the image forming apparatus main assembly 101 due to maintenance or the like, the developing device 4 is moved to the separated position, where the developing device 4 is separated from the photosensitive drum 1, by releasing the pressing of the developing device 4, and thereafter is pulled out to the front side of the image forming apparatus main assembly 101, so that dismounting of the developing device 4 from the image forming apparatus main assembly 101 is enabled. FIG. 8 shows a state in which the developing device 4 is in the separated position.

In the pressing position, as shown in FIG. 5, the duct wall 217 forms an upper side of the cooling duct 215. The duct wall 217 forms the top surface portion 218 and the connecting walls 219a and 219b extending downward from the toner surface portion 218. To the connecting walls 219a and 219b, the side walls 414a and 414b are connected through the first and second seal members 415a and 415b, so that leakage of the airflow 216 from the connecting portions and the airflow 216 is caused to pass through the inside of the resultant space as the duct.

On the other hand, in the separated position, as shown in FIG. 8, the developing device 4 is separated from the photosensitive drum 1 by being moved in an arrow A direction (predetermined direction) which is a substantially perpendicular direction, which is substantially parallel to the opposing surface 218a, to an extension direction of the ribs 412 and 416. As described above, the side walls 414a and 414b are positioned downstream of the connecting walls 219a and 219b, respectively, with respect to the predetermined direction. For this reason, the connecting walls 219a and 219b of the duct wall 217 and the side walls 414a and 414b of the heat sink 409 are separated from each other, and do not interfere with each other when the developing device 4 is pulled out from the image forming apparatus main assembly 101.

Further, in this embodiment, a distance between the opposing surface 218a and the free end 412a of the rib 416, of the plurality of ribs 412 and 416, positioned on a most downstream side with respect to the predetermined direction is made larger than a distance between the opposing surface 218a and the free end of the connecting wall 219a. In other words, the heat sink 409 is provided with the rib 416 such that the distance of the free end 412a of the rib to the opposing surface 218a is made larger than the distance from the free end of the connecting wall 419a to the opposing surface 218a of the top surface portion 218. By providing this rib 416, when the developing device 4 is moved from the developing position to the separated position, the rib 416 can be disposed even in a position of interference with the connecting wall 219a, so that it becomes possible to increase a surface area of the heat sink 409.

By these, in the developing device 4 provided with the heat sink 409, it becomes possible to cause the airflow to efficiently pass through the ribs 412 and 416 of the heat sink 409, so that efficient cooling of the developer in the developing device and a maintenance property of the developing device can be compatibly realized. As a result, it becomes possible to form a more stable image.

OTHER EMBODIMENTS

In this embodiment, as the developing device, the constitution in which there are two developer carrying members was described, but the present invention is also applicable to a developing device provided with only one developer carrying member.

According to the present invention, cooling efficiency of the cooling duct for cooling the developer in the developing device can be enhanced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-123916 filed on Jul. 29, 2021, which is hereby incorporated by reference herein in its entirety.

What is claimed is:

1. An image forming apparatus comprising:
   an image bearing member;
   a developing device which includes a developer container configured to accommodate a developer containing toner and a carrier and which includes a developer carrying member configured to carry the developer for developing an electrostatic image formed on said image bearing member;
   a mounting portion configured to mount said developing device in said image forming apparatus;
   a moving mechanism configured to move said developing device mounted in said mounting portion from a separated position where said developing device is separated from said image bearing member to a developing position where the electrostatic image formed on said image is developed;

a cover member provided in said mounting portion along a mounting direction in which said developing device is mounted in said mounting portion and configured to cover said developer container by being mounted on said developer container;
a wall member provided along the mounting direction, wherein when said developing device is moved from the separated position to the developing position by said moving mechanism, said wall member is not moved together with said developing device;
a first seal member;
a second seal member provided downstream of said first seal member with respect to a movement direction in which said developing device is moved from the separated position to the developing position by said moving mechanism; and
a fan configured to generate an airflow for cooling said developing device,
wherein when said developing device is in the separated position, neither said first seal member nor said second seal member contacts said wall member, and
when said developing device is in the developing position, both said first seal member and said second seal member contact said wall member, and
wherein when said developing device is in the developing position, a space for permitting passing of the airflow by said fan is formed along the mounting direction by said cover member, said wall member, said first seal member, and said second seal member.

2. An image forming apparatus according to claim 1, wherein said cover member includes a first rib and a second rib provided downstream of said first rib with respect to the movement direction, and,
wherein when said developing device is in the developing position, said first seal member contacts said first rib and said second seal member contacts said second rib.

3. An image forming apparatus according to claim 1, wherein both said first seal member and said second seal member are mounted on said cover member.

4. An image forming apparatus according to claim 1, wherein said cover member is mounted on an upper portion of said developer container and covers the upper portion of said developer container, and
wherein when said developing device is in the developing position, said wall member is above said cover member with respect to a vertical direction.

5. An image forming apparatus according to claim 1, wherein said cover member is higher in thermal conductivity than said developer container.

6. An image forming apparatus according to claim 1, wherein said wall member is higher in thermal conductivity than said developer container.

7. An image forming apparatus according to claim 1, wherein said first seal member is higher in thermal conductivity than said developer container, and
wherein said second seal member is higher in thermal conductivity than said developer container.

8. An image forming apparatus according to claim 1, wherein said cover member is a heat sink.

9. An image forming apparatus according to claim 1, wherein said cover member is made of metal.

10. An image forming apparatus according to claim 1, wherein said wall member is made of metal.

11. An image forming apparatus according to claim 1, wherein said developer container is made of resin.

12. An image forming apparatus comprising:
an image bearing member;
a developing device which includes a developer container configured to accommodate a developer containing toner and a carrier and which includes a developer carrying member configured to carry the developer for developing an electrostatic image formed on said image bearing member;
a mounting portion configured to mount said developing device in said image forming apparatus;
a moving mechanism configured to move said developing device mounted in said mounting portion from a separated position where said developing device is separated from said image bearing member to a developing position where the electrostatic image formed on said image is developed;
a cover member provided in said mounting portion along a mounting direction in which said developing device is mounted in said mounting portion and configured to cover said developer container by being mounted on said developer container;
a wall member provided along the mounting direction, wherein when said developing device is moved from the separated position to the developing position by said moving mechanism, said wall member is not moved together with said developing device;
a seal member provided on said cover member; and
a fan configured to generate an airflow for cooling said developing device,
wherein when said developing device is in the developing position, a space for permitting passing of the airflow by said fan is formed along the mounting direction by said cover member, said wall member, and said seal member.

13. An image forming apparatus according to claim 12, wherein said cover member is mounted on an upper portion of said developer container and covers the upper portion of said developer container, and
wherein when said developing device is in the developing position, said wall member is above said cover member with respect to a vertical direction.

14. An image forming apparatus according to claim 12, wherein said cover member is higher in thermal conductivity than said developer container.

15. An image forming apparatus according to claim 12, wherein said wall member is higher in thermal conductivity than said developer container.

16. An image forming apparatus according to claim 12, wherein said seal member is higher in thermal conductivity than said developer container.

17. An image forming apparatus according to claim 12, wherein said cover member is a heat sink.

18. An image forming apparatus according to claim 12, wherein said cover member is made of metal.

19. An image forming apparatus according to claim 12, wherein said wall member is made of metal.

20. An image forming apparatus according to claim 12, wherein said developer container is made of resin.

* * * * *